United States Patent Office 3,847,884
Patented Nov. 12, 1974

3,847,884
ACRYLONITRILE (CO)POLYMERS CONTAINING ANTISTATIC AGENTS
Edward Radlmann and Gunther Nischk, Dormagen, Germany, assignors to Bayer Aktiengesellschaft, Leverkusen, Germany
No Drawing. Filed Apr. 20, 1973, Ser. No. 353,019
Claims priority, application Germany, Apr. 21, 1972, P 22 19 532.0
Int. Cl. C08f *3/76, 15/02, 15/22*
U.S. Cl. 260—85.5 R                                    6 Claims

ABSTRACT OF THE DISCLOSURE

The invention relates to synthetic polymers, particularly acrylonitrile (co)polymers which contain as antistatic agent, 1 to 20% by weight, based on the total solids content of alkoxylation products with tertiary carbonamide or sulfonamide groups attached to ether groups.

---

This invention relates to acrylonitrile (co)polymers which contain antistatic agents.

Shaped products of acrylonitrile (co)polymers, especially fibres, are restricted in their possible commercial applications owing to their high electric surface resistance and the consequent ease with which they accumulate undesirable electrostatic charges.

There have been many attempts to overcome this difficulty. A permanent antistatic finish cannot be achieved by applying suitable antistatic agents to the shaped product because the antistatic effect is destroyed by solvolytic or mechanical action. Theoretically the most promising process for achieving a permanent antistatic effect, namely the copolymerisation of suitable comonomers which reduce the surface resistance, has up till now failed to produce any polymers which would be of practical use because polymerisation to yield readily soluble linear macro-molecules entails great difficulties. A simpler process consists in adding compatible antistatic agents which are temperature resistant and resistant to evaporation, hydrolysis and washing to the polymer solution or melt before shaping. The antistatic additives previously used are dithiocarbonates, phosphoric acid amides, aminocarboxylic acid amides, ureas, polyalkylene oxides and alkoxylated alcohols which contain sulphonate end groups.

It has now been found that acrylonitrile (co)polymers which contain as additives alkoxylation products with tertiary carbonamide or sulphonamide groups attached to ether groups demonstrate a permanent antistatic effect by a reduction in the surface resistance. The effect of the additives is not restricted to acrylonitrile (co)polymers but also applies to many other synthetic polymers.

This invention therefore relates to synthetic polymers, particularly acrylonitrile (co)polymers, which contain, as antistatic agent, 1 to 20% by weight, based on the total solids content, of a compound of the general formula $$A \left[ \left( CH-CH-O \right)_m -B-X-N \begin{matrix} R_1 \\ Y \end{matrix} \right]_n$$

wherein
$m$ represents an integer of from 1–150,
$n$ represents 1 or 2,
R represents hydrogen or a methyl group,
$R_1$ represents a member of the group consisting of a straight chain alkyl radical containing 1–20 carbon atoms, a branched chain alkyl radical containing 1–20 carbon atoms and an aryl radical, X represents the group consisting of $$-\overset{O}{\underset{\|}{C}}-$$

and $-SO_2-$,
B represents a member of the group consisting of an alkylene radical containing one or two carbon atoms and an arylene radical of the following general formula:

[structure: benzene ring substituted with $R_2$, $R_2$, $R_3$, $R_3$]

wherein $R_2$ represents a member of the group consisting of hydrogen, a lower alkyl radical containing 1–6 carbon atoms, fluorine, chlorine, bromine and iodine, $R_3$ represents a member of the group consisting of hydrogen, $NH_2$, $NO_2$, CN, $CF_3$, Cl and $$-SO_2-\!\!\left\langle\!\bigcirc\!\right\rangle\!\!-\!\!\left(O-\underset{R}{\overset{R}{CH}}-\underset{R}{\overset{R}{CH}}\right)_m\!\!-A$$

in which R, $R_1$, X and $m$ have the meanings indicated above,
A represents the radical selected from the group consisting of $R_4-O-$, $$R_4-\overset{R_4}{\underset{|}{N}}-, \quad R_4-N\!\!\diagup^{\diagdown}, \quad R_4-\overset{O}{\underset{\|}{C}}-O-,$$

[structure with $R_1$, N-X, $R_2$, $R_3$, benzene ring, -O-]

[structure with $R_1$, N-X, $R_2$, $R_3$, benzene ring, $(O-CHR-CHR)_m$-O-$R_5$-O-]

[structure with $R_1$, N-X, $R_2$, $R_3$, benzene ring, $(O-CHR-CHR)_m$-N-$R_4$]

and

[structure with $R_1$, N-X, $R_2$, $R_3$, benzene ring, $(O-CHR-CHR)_m$-O-C(=O)-$R_5$-C(=O)-O-]

wherein R, $R_1$, $R_2$, $R_3$, X and $m$ have the meanings indicated above, $R_4$ represents a member of the group consisting of an alkyl radical containing 1 to 30 carbon atoms, an aryl, alkylaryl and arylalkyl radical and $R_5$ represents a straight or branched chain alkylene radical with 1 to 30 carbon atoms and
Y represents a straight or branched chain alkyl radical with 1–20 carbon atoms, an aryl radical or, when $n=1$, it represents a radical of the general formula $$-R_5-\overset{R_1}{\underset{|}{N}}-X-B-\!\!\left(O-\underset{R}{\overset{R}{CH}}-\underset{R}{\overset{R}{CH}}\right)_m\!\!-A$$

wherein R, $R_1$, $R_5$, A, B, X and $m$ have the meanings indicated above.

Acrylonitrile (co)polymers according to the invention are obtained, preferably in the form of threads, by adding 1 to 20% by weight, based on the total solids content, of compounds of the general formula

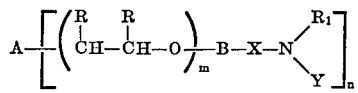

wherein A, B, R, $R_1$, X, Y, $m$ and $n$ have the meanings indicated above to spinnable solutions or melts of these polymers and then working up the solution or melt into shaped articles.

The antistatic agents added according to the invention are obtained, for example, when polyether diols of ethylene oxide or propylene oxide or alkoxylation products, preferably alcohols which have been reacted preferably with ethylene oxide, propylene oxide or mixtures of the two, diols, primary or secondary aliphatic or aromatic amines or mono- or dicarboxylic acids of the general formula

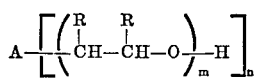

wherein A, R, $m$ and $n$ have the meanings indicated above are reacted in the form of their alcoholates either as melts or in an inert solvent with a compound of the general formula

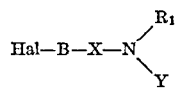

wherein B, X, Y and $R_1$ have the meanings indicated above and Hal represents fluorine, chlorine or bromine, with the elimination of the alkali metal halide, the reaction being carried out under an inert gas and with the exclusion of moisture and at temperatures between 0 and 150° C.

If desired, of course, the reaction may also be carried out using compounds which contain carboxylic acid or sulphonic acid end groups, in which case the compounds are converted into the corresponding acid chlorides and then reacted with suitable amines to obtain the desired compounds with carbonamide or sulphonamide end groups.

Those compounds in which $R_2$ represents $NH_2$ are obtained by the catalytic hydrogenation of the corresponding nitro compound.

The inert solvents used may be, for example, benzene, toluene, dioxane, dimethylformamide, dimethylacetamide or N-methylpyrrolidone. The inert gases used may be hydrogen, nitrogen or helium.

The following are given as examples of antistatic additives which may be used according to the invention:

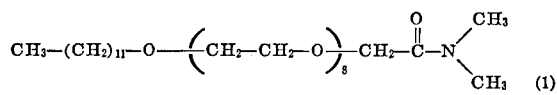

(1)

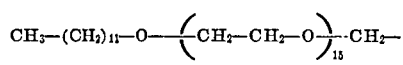

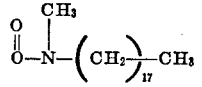

(2)

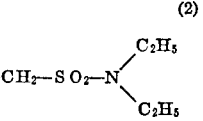

(3)

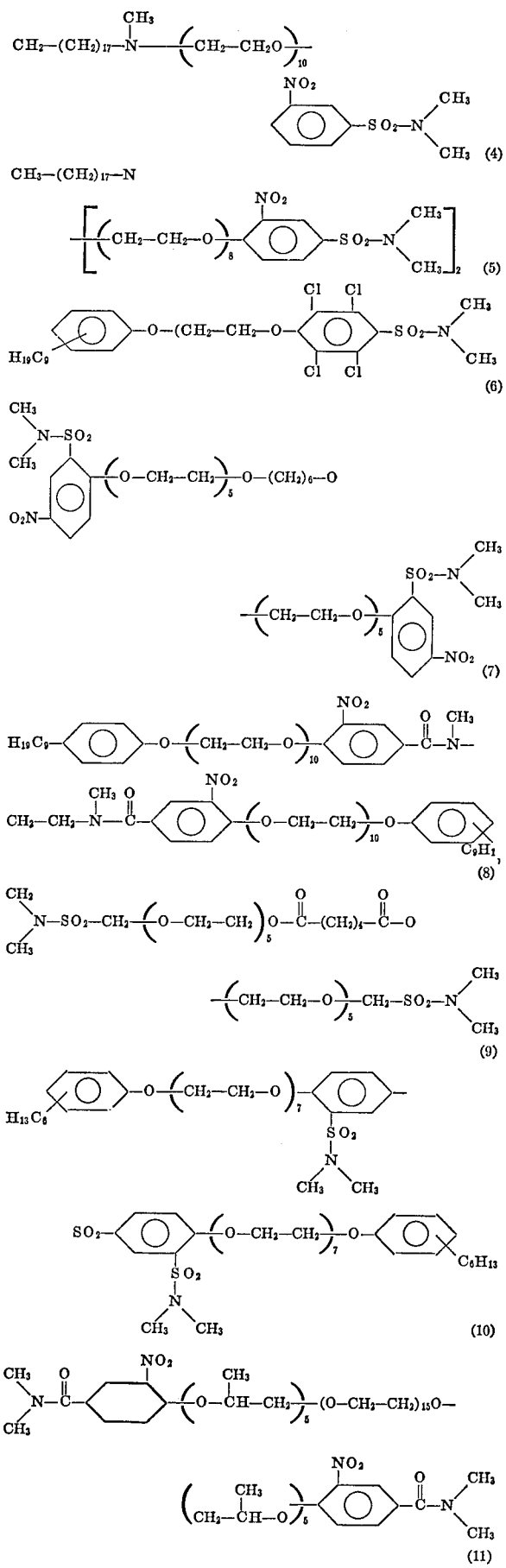

The antistatic agents according to the invention are compatible with acrylonitrile (co)polymer solutions without showing any separation of the solution into its components. In addition, other additives such as stabilizers, fillers, dyes, pigments and antioxidants may be added without the reduction in surface resistance being thereby impaired or any separation into components taking place. Such mixtures can easily be worked up into threads.

Suitable acrylonitrile polymers for the purpose of the invention are not only pure polyacrylonitrile itself but also polymers which contain at least 60% by weight of polymerised acrylonitrile and up to 40% by weight of other copolymerisable compounds taken from the group of vinyl and (meth)acrylic compounds present in a copolymerised form. These copolymerised compounds include, for example, (meth)acrylic acid esters, (meth)acrylic acid amides, vinyl chloride, vinylidene chloride as well as those copolymerisable compounds which improve the affinity for acid or basic dyes.

The solvents used may be any substances which dissolve polyacrylonitrile, dimethylformamide being particularly suitable.

It is a great advantage that the surface resistance of the fibres which contain the additives according to the invention remains substantially unchanged even after repeated washing with alkaline detergents owing to the fact that the antistatic agents are practically insoluble in water. Apart from their excellent antistatic action, the acrylonitrile polymers according to the invention are distinguished by their high affinity for basic dyes.

EXAMPLE 1

5.4 parts by weight of sodium methylate dissolved in 50 parts by volume of methanol were added to 71.9 parts by weight of an anhydrous ethoxylated stearyl alcohol (molecular weight=719, determined by the OH number). After evaporation of the methanol at 70° C. under vacuum, the solution was cooled to 20° C. 12.2 parts by weight of N,N-dimethylchloroacetamide were then slowly added dropwise under a stream of nitrogen while the reaction mixture was cooled so that the temperature did not rise above 25° C. When all the chloroacetamide had been added, stirring was continued for 30 minutes. A sample dispersed in water was then found to have a pH of 7.1. To remove the sodium chloride, the reaction product was taken up in 250 parts by volume of anhydrous benzene and filtered after the addition of active charcoal and the benzene was then removed by vacuum distillation. An almost colourless product which was liquid at room temperature and had the following constitution

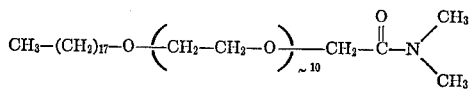

remained behind.

Yield: 77.2 parts by weight (96% of th theory).

EXAMPLE 2

4.6 parts by weight of sodium were dissolved in 170.6 parts by weight of an anhydrous ethoxylated dodecyl alcohol (molecular weight=853 determined by the OH number) under a stream of nitrogen. The alcoholate was dissolved in 350 parts by volume of anhydrous dimethyl formamide and 71.9 parts by weight of N-methyl-N-stearyl-chloroacetamide were then added portionwise under a stream of nitrogen with stirring so that the temperature did not rise above 50° C. After completion of the reaction, as indicated by the fact that a sample dispersed in water is at pH=7, active charcoal was added, the precipitated sodium chloride was removed by filtration and DMF is removed by evaporation under vacuum.

A pale yellow, waxy product having the following composition

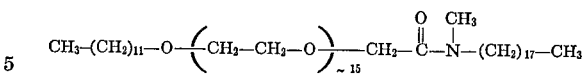

was left behind.

Yield: 231 parts by weight (98% of the theory).

EXAMPLE 3

10.8 parts by weight of sodium methylate in 50 parts by volume of methanol were added to 146.8 parts by weight of anhydrous ethoxylated N-methyl-stearylamine (molecular weight=734 determined by the OH number). After removal of the methanol under vacuum at 70° C. the alcoholate was dissolved in 300 parts by volume of anhydrous dimethylformamide. 52.9 parts by weight of N,N-dimethyl-3-nitro - 4 - chloro-benzene-sulphonamide were added portionwise under a stream of nitrogen at such a rate that the temperature did not rise above 50° C. Stirring was then continued for one hour at 50° C. The neutral solution was then freed from precipitated sodium chloride by filtration after the addition of active charcoal. 187.6 parts by weight (97.5% of the theory) of a yellow product which was liquid at room temperature and had the following composition

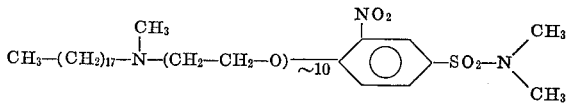

remained behind after removal of dimethylformamide by vacuum distillation.

EXAMPLE 4

134.2 parts by weight of dehydrated ethoxylated isononyl phenol (molecular weight=671 determined by the OH number) were mixed with 10.8 parts by weight of sodium methylate in 50 parts by volume of methanol under a stream of nitrogen. The methanol was then removed quantitatively by evaporation under vacuum at 60° C. and the alcoholate which remained behind was dissolved in 250 parts by volume of anhydrous dimethylformamide. 71.5 parts by weight of N,N-dimethyl-pentachloro-benzene-sulphonamide were added portionwise to this solution with stirring under a stream of nitrogen in such a manner that the temperature did not rise above 70° C. Stirring was continued at 70° C. for 2 hours after completion of the exothermic reaction. The solution, which is neutral in reaction, was then freed from the precipitated sodium chloride by filtration after the addition of active charcoal and freed from dimethylformamide by vacuum distillation. 195.8 parts by weight (98.7% of the theory) of a material which was only slightly yellow and not solid at room temperature and had the following composition

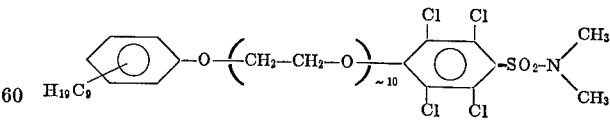

remained behind.

EXAMPLE 5

21.6 Parts by weight of sodium methylate in 60 parts by volume of methanol were added to 113.0 parts by weight of anhydrous ethoxylated hexane-1,6-diol (molecular weight=565 determined by the OH number), the methanol was distilled off quantitatively under vacuum at 70° C., and 117.0 parts by weight of N,N-diethyl-3-nitro-6-chloro-benzene-sulphonamide were added portionwise under a stream of nitrogen with stirring in such a manner that the temperature did not rise above 70° C. To complete the reaction, stirring was continued for 2 hours at 70° C. until the reaction mixture was neutral. It was then dissolved in 250 parts by volume of dimethylformamide and filtered after the addition of active charcoal and the dimethylformamide was then removed under vacuum. The residue was yellow, partly solid at room temperature and had the following constitution:

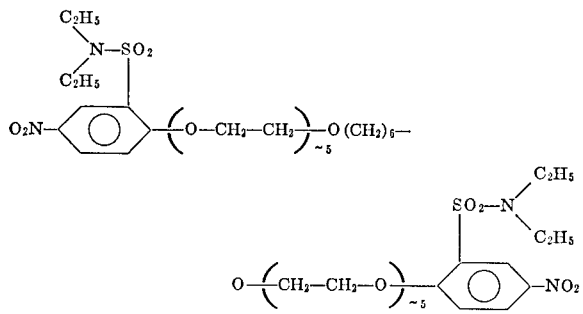

Yield: 206.4 parts by weight (95.8% of the theory).

EXAMPLE 6

4.6 Parts by weight of sodium are dissolved in 105.9 parts by weight of an anhydrous segmented polyaddition product of ethylene oxide and propylene oxide (molecular weight=1059 determined by the OH number) of the following formula

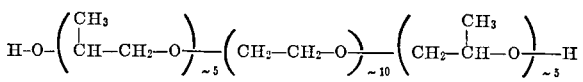

at 70° C. with exclusion of moisture and oxygen. 45.7 Parts by weight of N,N-dimethyl-3-nitro-4-chlorobenzamide are added to the alcoholate in portions under a stream of nitrogen and with stirring, the temperature being maintained at 70° C. to complete the reaction, stirring is continued for 3 hours at 70° C. until the reaction mixture is neutral. The reaction mixture is then dissolved in 300 parts by volume of dimethylformamide, treated with animal charcoal and filtered and the dimethylformamide is then distilled off under vacuum. The yellow reaction product represented by the following formula

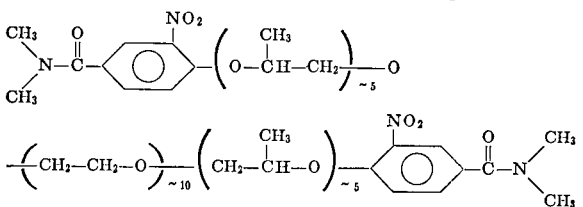

is obtained in quantitative yield. It is not solid at room temperature.

To convert the nitro groups into the corresponding amino functions, 72.0 parts by weight of the above product in 200 parts by volume of dimethylformamide are hydrogenated for one hour at a hydrogen pressure of 40 excess atmospheres and a temperature of 75° C. in the presence of 10 parts by weight of Raney nickel. After removal of the hydrogenation catalyst by filtration and removal of dimethylformamide by evaporation under vacuum, 67.9 parts by weight (98.3% of the theory) of an almost colourless reduction product which has the following constitution

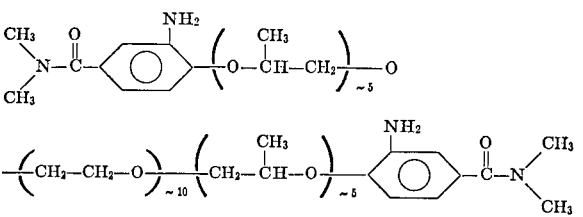

are obtained.

EXAMPLE 7

The following antistatic agents are added in varying quantities to a 27% solution in dimethylformamide of a polyacrylonitrile copolymer obtained from 94 parts by weight of acrylonitrile, 5 parts by weight of methyl acrylate and 1 part by weight of sodium methallylsulphonate which has a K-value of 87 (according to Fikentscher):

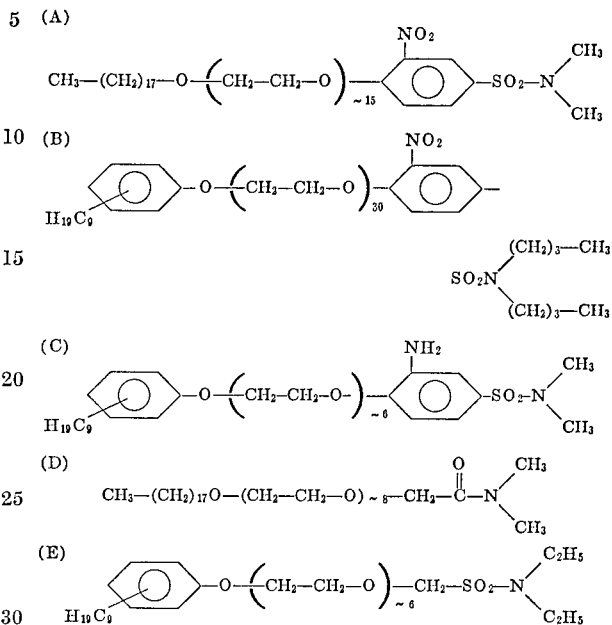

The solutions are dry spun into threads in known manner. The surface resistance of the stretched threads is measured after air conditioning at 23° C. and 50% relative humidity. The threads are then washed with a 0.5% solution of an ordinary commercial detergent at 40° C. They are then dried and air conditioned and their surface resistance is again measured.

The results are summarised in Table 1 below. A sample thread which has not been treated with antistatic additive is used for comparison.

TABLE 1

| Antistatic additive | Surface resistance at 23° C. and 50% relative humidity (Ω) after— | | |
|---|---|---|---|
| | Stretching | 5 washings | 10 washings |
| None | >$10^{13}$ | >$10^{13}$ | >$10^{10}$ |
| 10% by weight A | 9·$10^{10}$ | 9·$10^{10}$ | 8·$10^{13}$ |
| 8% by weight B | 6·$10^{10}$ | 8·$10^{10}$ | 1·$10^{10}$ |
| 15% by weight C | 1·$10^{10}$ | 1·$10^{10}$ | 4·$10^{11}$ |
| 10% by weight D | 5·$10^{10}$ | 7·$10^{10}$ | 7·$10^{10}$ |
| 5% by weight E | 2·$10^{11}$ | 1·$10^{11}$ | 2·$10^{11}$ |

EXAMPLE 8

The antistatic agents mentioned in Example 7 are added in varying quantities to a 27% dimethylformamide solution of a polyacrylonitrile copolymer of 61.3 parts by weight of acrylonitrile, 37 parts by weight of vinylidene chloride and 1.7 parts by weight of sodium methallylsulphonate with a K-value of 80 (according to Fikentscher) in exactly the same way as described in Example 7. The threads are produced by dry spinning, tested to determine their surface resistance and washed in the same way as in Example 7.

The results obtained from measuring the surface resistance are summarized in Table 2 in relation to the antistatic additive used and the number of washings carried out.

TABLE 2

| Antistatic additive | Surface resistance at 23° C. and 50% relative humidity (Ω) after— | | |
|---|---|---|---|
| | Stretching | 5 washings | 10 washings |
| None | >$10^{13}$ | >$10^{13}$ | >$10^{13}$ |
| 10% by weight A | 8·$10^{10}$ | 8·$10^{10}$ | 1·$10^{11}$ |
| 10% by weight B | 5·$10^{10}$ | 6·$10^{10}$ | 8·$10^{10}$ |
| 5% by weight C | 1·$10^{11}$ | 3·$10^{11}$ | 3·$10^{11}$ |
| 8% by weight D | 4·$10^{10}$ | 6·$10^{10}$ | 6·$10^{10}$ |
| 15% by weight E | 1·$10^{10}$ | 2·$10^{10}$ | 1·$10^{10}$ |

What is claimed is:

1. Composition comprising acrylonitrile homopolymer or copolymer, and as antistatic additive 1–20% by weight, based on the total quantity of the composition a compound of the formula

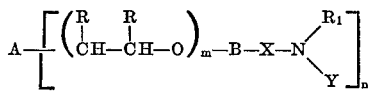

in which
m is an integer of from 1–150;
n is 1 or 2;
A is $R_4$—O—,

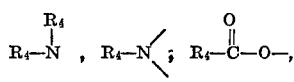

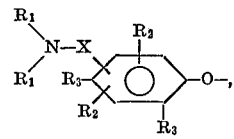

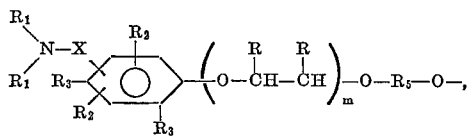

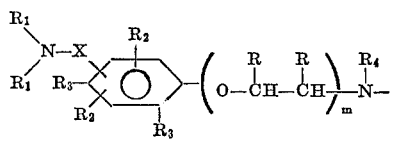

or

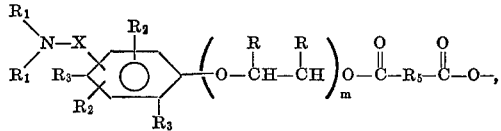

B is an alkylene radical with 1 or 2 carbon atoms or an arylene radical of the formula

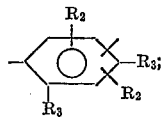

R is hydrogen or methyl;
$R_1$ is a straight or branched chain alkyl radical containing 1–20 carbon atoms or an aryl radical;
$R_2$ is hydrogen, alkyl containing 1–6 carbon atoms, fluorine, chlorine, bromine or iodine;
$R_3$ is hydrogen, $NH_2$, $NO_2$, CN, $CF_3$, Cl or

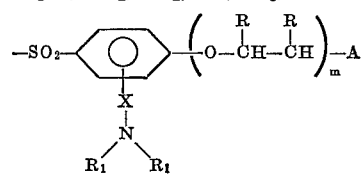

$R_4$ is alkyl radical containing 1–30 carbon atoms, an aryl, alkyl-aryl or arylalkyl radical;
$R_5$ is a straight or branched chain alkylene radical containing 1–30 carbon atoms;
X is

or —$SO_2$—; and
Y is a straight or branched chain alkyl radical containing 1 to 20 carbon atoms or an aryl radical; or where n=1, a radical of the formula

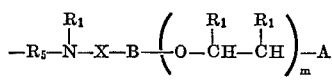

2. Composition of Claim 1 in which the acrylonitrile polymer is a copolymer comprising at least 60% by weight of acrylonitrile and up to 40% by weight of one or more vinyl compounds which are capable of being copolymerized with acrylonitrile.

3. Composition of Claim 2 in which said vinyl compounds are selected from the group consisting of acrylic acid esters, methacrylic acid esters, acrylic acid amides, methacrylic acid amides, vinyl chloride, vinylidene chloride and mixtures thereof.

4. Composition of Claim 1 in which the acrylonitrile polymer comprises a copolymer of acrylonitrile and a vinyl monomer which improves the affinity of the copolymer for acid or basic dyes.

5. Process for the production of antistatic composition of Claim 1 which comprises the steps of (a) adding 1–20% of an antistatic agent to a spinnable solution of acrylonitrile homopolymer or copolymers; and (b) spinning said solutions; said antistatic agent comprising the compound defined in Claim 1 having the formula

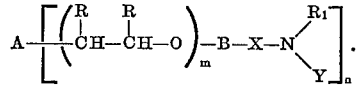

6. A thread or foil comprising the composition of Claim 1.

References Cited
UNITED STATES PATENTS
2,727,004  12/1955  Cohen _____ 260—DIG 19
3,644,310  2/1972  Hopkins _____ 260—85.5 R HARRY WONG, JR., Primary Examiner U.S. Cl. X.R.

260— 32.6 N, 45.85 N, 45.85 P, 45.9 P, 45.95 R, 45.95 C, 79.3 M, 80.73, 80.77, 80.81, 88.7 R, Dig. 15, Dig. 19

UNITED STATES PATENT AND TRADEMARK OFFICE
CERTIFICATE OF CORRECTION

PATENT NO. : 3,847,884
DATED : November 12, 1974
INVENTOR(S) : Edward Radlmann et al It is certified that error appears in the above-identified patent and that said Letters Patent are hereby corrected as shown below:

Column 4, first formula, "$CH_2-CH_2O$" should read --- $CH_2-CH_2-O$ ---.

Column 4, line 40, last part of the formula "$H_1$" should read --- $H_{19}$ ---.

Column 5, line 60, "th" should be --- the ---.

Column 7, line 34, "to" should read --- To ---.

Column 8, under heading Table I and under the sub-heading "After 10 washings"

$>10^{10}$ should be --->$10^{13}$ ---

$8.10^{13}$ should be --- $8.10^{10}$ ---

$1.10^{10}$ should be --- $1.10^{11}$ ---

$4.10^{11}$ should be --- $4.10^{10}$ ---.

Signed and Sealed this twelfth Day of July 1977

[SEAL]

Attest:

RUTH C. MASON
*Attesting Officer*

C. MARSHALL DANN
*Commissioner of Patents and Trademarks*